Feb. 4, 1936.  A. C. I. COULTER  2,029,655

APPARATUS FOR STRAINING SUGAR CANE JUICE

Filed May 22, 1934  2 Sheets-Sheet 1

Inventor
Andrew C. I. Coulter
By Ritter, Mechlin & O'Neill
his Attorneys

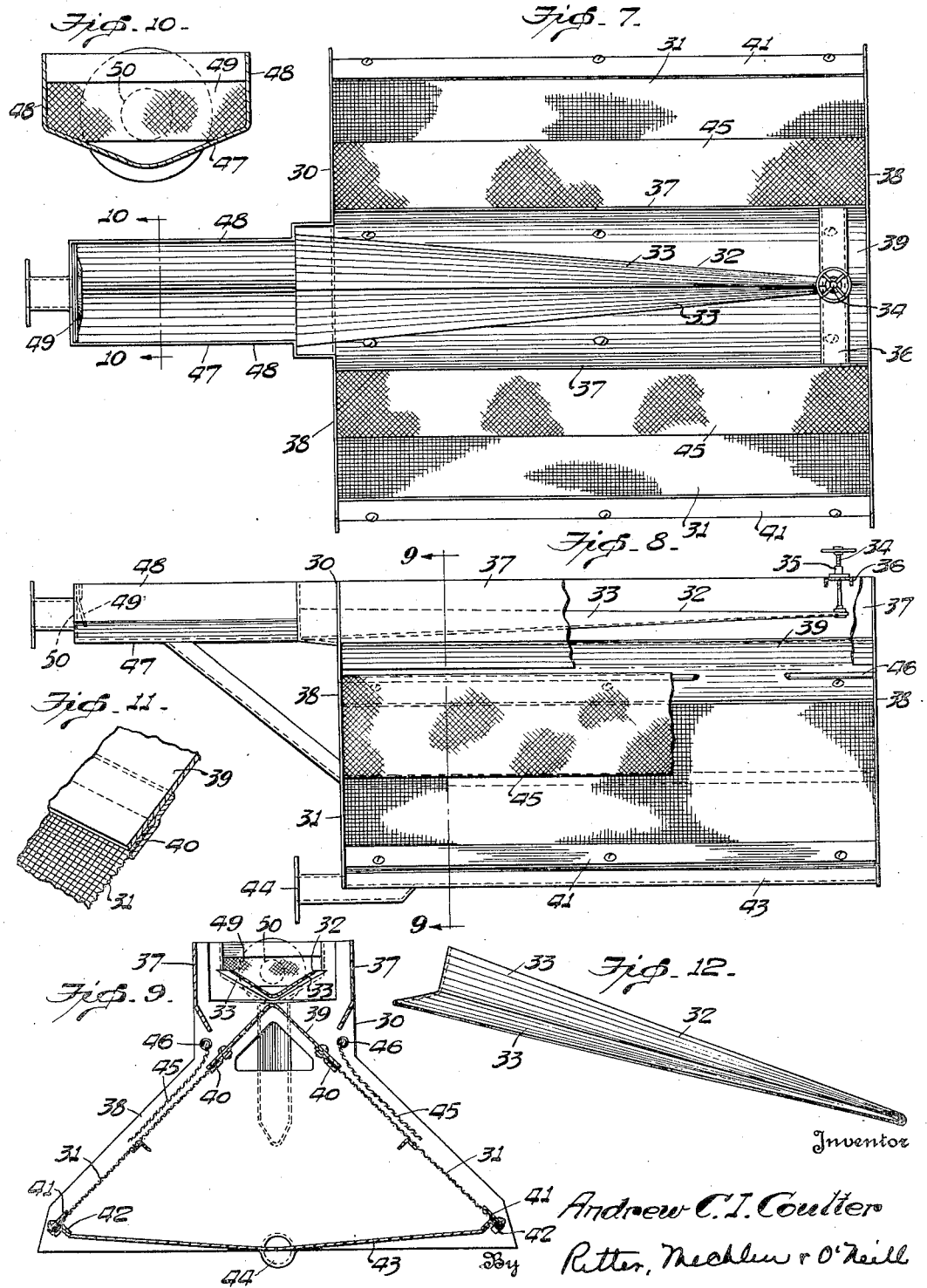

Patented Feb. 4, 1936

2,029,655

UNITED STATES PATENT OFFICE 2,029,655

APPARATUS FOR STRAINING SUGAR CANE JUICE

Andrew C. I. Coulter, Naalehu, Territory of Hawaii

Application May 22, 1934, Serial No. 726,981

15 Claims. (Cl. 210—149)

My invention relates to straining apparatus for sugar cane mills and more particularly to that type of straining apparatus in which the small particles of bagasse, known as cush-cush, strained from the juice are returned to the mill for further treatment and in which sugar juice mixed with water of maceration is returned to the mill for further macerating the bagasse.

One of the principal objects of the invention is to so construct the straining apparatus that the cush-cush will be evenly distributed for return to the mill.

Another object of the invention is to provide the straining apparatus with means for regulating the flow of the sugar juice mixed with water of maceration in its return to the mill.

A primary feature of the invention consists in providing the straining apparatus with a delivery trough for distributing the cush-cush laden juice substantially evenly to a screen device, whereby the cush-cush is collected on the screen in a blanket of substantially uniform width for return to the mill.

Another feature of the invention consists in providing the delivery trough of the straining apparatus with an edge which is inclined downwardly relatively to the bottom of the trough in the direction of flow of the juice over which the juice is adapted to discharge onto an inclined screen.

Another feature of the invention consists in forming the delivery trough of the straining apparatus so that it progressively decreases in width and length in the direction of flow of the juice.

A further feature of the invention consists in adjustably mounting the delivery trough of the straining apparatus for the purpose of varying the angle of the discharge edge thereof with respect to the horizontal so as to insure even discharge of the juice over the entire length of the edge irrespective of the rate of flow of the juice in the trough.

A still further feature of the invention consists in providing the straining apparatus with a compartment for receiving the strained juice, the compartment having outlet means for permitting discharge of the strained juice therefrom for delivery to the mill which is of such capacity as compared with the average rate of flow of the juice to maintain a predetermined head of juice in the compartment.

A still further feature of the invention consists in providing the apparatus with a compartment for initially receiving the strained juice and with a chamber for receiving the juice from the compartment for delivery to the sugar mill, the compartment being provided with means establishing communication with the chamber of such capacity as compared with the average rate of flow of the juice to the straining apparatus to maintain a head of juice in the compartment.

Other and more specific features of the invention, residing in advantageous forms, combinations and relations of parts, will hereinafter appear and be pointed out in the claims.

In the drawings

Figure 7 is a plan view of the straining apparatus from which the juice is delivered to the factory.

Figure 8 is a side elevational view of the apparatus illustrated in Figure 7.

Figure 9 is a vertical sectional view taken on line 9—9 of Figure 8.

Figure 10 is an enlarged sectional view taken on line 10—10 of Figure 7.

Figure 11 is a fragmentary perspective view of a portion of the apparatus illustrating the manner in which the straining screen is associated therewith.

Figure 12 is a perspective view of the delivery trough of the apparatus illustrated in Figure 7.

Figure 1:
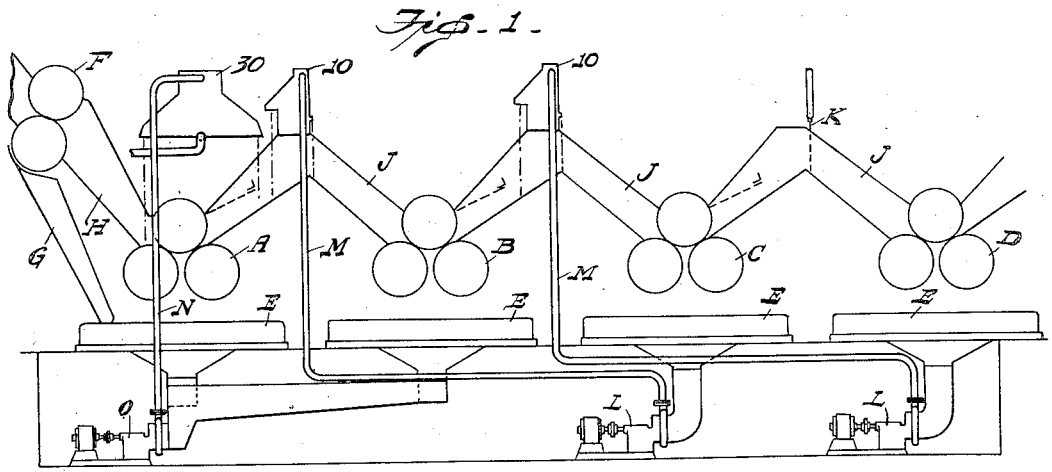
Figure 1 is a diagrammatic side elevation of a typical sugar mill system with my invention applied thereto.
Figure 2:
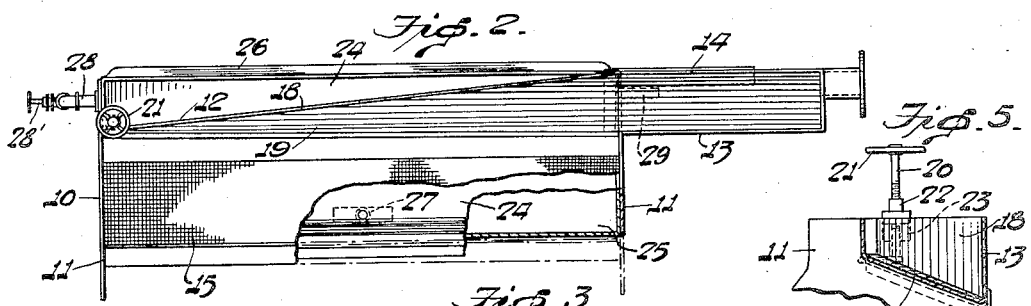
Figure 2 is a plan view, with parts broken away, of the straining apparatus which is adapted to return the sugar juice to the system for further macerating the bagasse.
Figure 3:
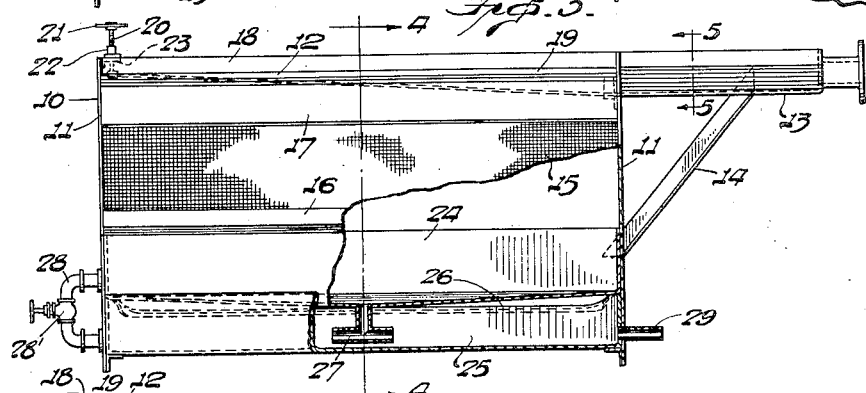
Figure 3 is a side elevational view of the apparatus illustrated in Figure 2.
Figures 4, 5, 6:
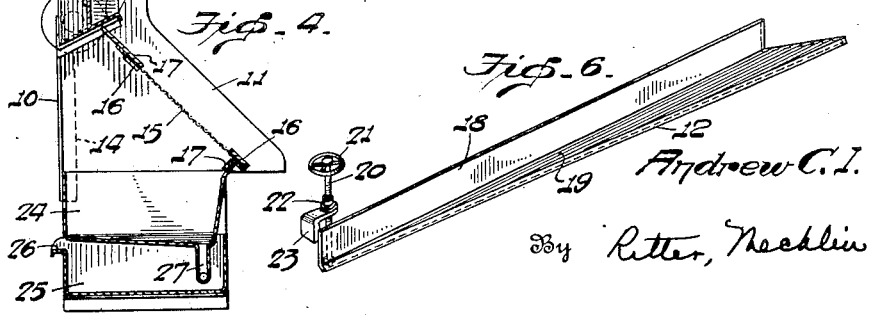
Figure 4 is a vertical sectional view taken on line 4—4 of Figure 3.
Figure 5 is an enlarged sectional view taken on line 5—5 of Figure 3.
Figure 6 is a perspective view of the delivery trough of the apparatus illustrated in Figure 2.

Referring more particularly to the drawings, the sugar mill system diagrammatically illustrated in Figure 1 is of the type employing four mills respectively designated by the reference letters A, B, C and D. Disposed below each of the mills is a pan E for receiving the juice extracted by the mill. Located forwardly of the first mill A is a suitable cane crusher F by means of which some juice is extracted from the cane. The juice so extracted is conducted to the juice pan beneath mill A by chute or the like G and the crushed cane, that is to say, the bagasse, is led from the crusher F to mill A by a conduit or the like H. Carriers J of any of the well known types convey the bagasse from one mill to another.

To obtain maximum extraction of the juice, maceration water is applied to the bagasse as at K before it enters the last mill D. The juice extracted by the last mill being diluted by the maceration water is used to macerate the bagasse before it enters the preceding mill C and this return of diluted juice or maceration is continued, depending upon the number of mills in the system, until it reaches the second mill where, with the juices from the crusher and the first mill, it is delivered to the factory for conversion into sugar.

For returning the juice, which is diluted with the maceration water, from mill D for discharge onto the bagasse being conveyed to mill C, a suitable pump L may be employed for forcing the diluted juice through a pipe or conduit M to a straining apparatus designated generally by the reference numeral 10, which is disposed above the carrier extending between mills B and C. The diluted juice received from mill C is similarly conducted to a like straining apparatus disposed above the carrier extending between mills A and B. Disposed above mill A is another straining apparatus generally designated by the reference numeral 30 to which is conducted, by means of pipe N and pump O, the juice from the crusher F and mills A and B. While the cush-cush strained from the juice delivered to apparatus 30 is returned to the mill system, apparatus 30 differs from the straining apparatus 10 in that the juice, instead of being returned to the system, is conveyed to the factory.

The straining apparatus 10 illustrated in detail in Figures 2 to 5, inclusive, has side walls 11 and is preferably of a width substantially equal to the carriers J, which conduct the bagasse from one mill to the other. Adjacent its top, the straining apparatus is provided with a delivery trough 12 which may be advantageously formed with a lateral extension 13 projecting beyond one of the side walls 11 for connection, in any suitable manner, to the pipe M. The lateral extension may be braced by a diagonal strut 14. Disposed below the delivery trough and preferably extending the full width of the apparatus is an inclined screen 15 onto which the juice discharging from the trough is adapted to fall. The screen is connected along its upper and lower edges by strips 16 to longitudinally extending members 17, which serve to rigidly connect the side walls 11. The strips 16 may, of course, be removably secured to the members 17 in any suitable manner (not shown), so that the screen may be easily replaced. The delivery trough 12 has angularly disposed side walls 18 and 19 which converge downwardly and preferably intersect to form the bottom of the trough. Moreover, the trough progressively decreases in both width and depth in the direction of flow of the juice. This character of trough may be conveniently formed by arranging the wall 18 substantially vertical and at a slight angle to the direction of flow of the juice, so that it intersects with the upper edge of the wall 19 which is inclined with respect to the vertical at the outer end of the trough. The upper edge of the wall 19 constitutes a lip over which the juice discharges onto the screen 15 and it inclines downwardly relatively to the bottom of the trough. By providing a trough of this character, all of the cush-cush, which is more or less in suspension in the juice delivered to the trough, will be discharged from the latter and will not be allowed by settling to accumulate therein.

The discharge edge or lip of the trough, that is the upper edge of the wall 19, is so disposed that the cush-cush laden juice will be distributed evenly to the screen 15, or, in other words, so that equal quantities of the juice will flow over each increment of length of the discharge edge. In order that the discharge edge of the trough may be disposed to accomplish this desirable result, means is provided for raising and lowering one end of the trough, so that, having regard for the rate of flow of the juice, the discharge edge may be properly disposed. By providing means for varying the angular disposition of the discharge edge of the trough, the apparatus will effectively function to evenly distribute the cush-cush laden juice over the entire width of the screen, irrespective of the rate at which the juice is delivered to the apparatus. The adjusting means may advantageously comprise a screw threaded rod 20, one end of which is connected to the trough and the other end of which is provided with a suitable hand wheel 21. The intermediate portion of the rod cooperates with a screw threaded nut or the like 22, which may be rigidly mounted on a bracket 23 carried by the adjacent side wall 11 of the apparatus. Thus it will be perceived that, when the rod is rotated, it will move longitudinally and thereby cause movement of the end of the trough to which it is connected a corresponding amount.

As the cush-cush laden juice is distributed evenly to the screen, the cush-cush will collect on the latter in a blanket of substantially uniform width. The inclination of the screen is such that the cush-cush will move down the screen under the influence of gravity and fall evenly across the bagasse being conveyed by the carrier to the next adjacent mill.

Disposed beneath the screen 15 for receiving the juice passing therethrough is a compartment 24 which extends between and connects the side walls 11. This compartment communicates with a chamber 25, which likewise extends between and connects the walls 11 and it is provided with a horizontally disposed lip 26 of a length substantially equal to the width of the carriers extending between the mills over which the strained juice is adapted to flow for discharge onto the bagasse being conveyed by the carriers. The means establishing communication between the compartment 24 and the chamber 25 may be a T-shape pipe, such as illustrated at 27, and is of such capacity that a head of several inches of juice in compartment 24 is required to cause the juice to pass therefrom and consequently from the chamber 25 at a rate equal to the average rate, previously determined, at which the juice passes through the screen. By this means, a head of juice is normally maintained in the compartment 24, so that, should the rate at which the juice passes through the screen momentarily drop below the average rate, the rate at which the juice discharges onto the bagasse will only drop a fraction of the difference between the average rate and momentary rate. Thus greater uniformity of maceration is obtained. Moreover, due to the head of juice normally maintained in the compartment 24, the juice supplied to the bagasse will not stop entirely even though there be a momentary stoppage in the delivery of juice to the apparatus due to chokes in the pipe line or air binding at the pump. In the event of a momentary stoppage in the supply, the juice will continue to flow from compartment 24 to chamber 25 and, as the head decreases, the rate of flow will, of course, correspondingly decrease, but the horizontal area of the compartment is of sufficient size as to take care of stoppages which may be considered momentary. By providing the apparatus with means for normally maintaining a reserve supply of the juice, it will be perceived that the juice will be returned to the mill system at a rate closely approximating the average rate of flow of the juice to the straining apparatus.

To take care of peak loads and thus prevent the juice overflowing from compartment 24, the latter may be connected by a by-pass 28 with the chamber 25. This by-pass is provided with a suitable valve 28', which may be operated in any convenient manner and which is normally closed, being opened only when the rate at which the juice is supplied to the compartment is so much greater than the rate at which it flows therefrom through the pipe 27 that the capacity of the compartment is likely to be exceeded. If desired, the apparatus may be provided with suitable means, such as a pipe 29, which is adapted to be connected with a conduit (not shown) for conveying a part of the strained juice to the juice collecting pan for washing down cush-cush to the pump.

The straining apparatus 30 is in general similar to the straining apparatus 10 just described, except that, since the juice strained by it is to be delivered to the factory, it is not provided with means for maintaining a reserve supply of the juice. It also differs from apparatus 10 in that it is provided with two straining screens 31 arranged on opposite sides of the delivery trough 32. This trough, instead of being constructed so that the juice will discharge therefrom only on one side, is formed so that the juice will discharge from both sides. It, like the trough 12 of apparatus 10, is of substantially V-shape in cross section and progressively decreases in width and depth in the direction of flow of the juice. Its sides 33 are angularly disposed, being arranged at equal angles with respect to the vertical, and they intersect to form the bottom of the trough. The upper edges of the sides, which constitute lips over which the juice is adapted to discharge, converge in the direction of flow of the juice and practically intersect at the outer end of the trough.

Means is provided for raising and lowering the outer end of the trough so as to vary the angular disposition of the discharge edges thereof for the purpose of insuring a uniform flow of the juice over all portions of the discharge edges. This means involves a screw threaded rod 34 connected at one end to the trough and having threaded engagement with a nut 35 carried by a transversely extending member 36, which is secured at its opposite ends to longitudinally extending frame members 37 connecting the sides 38 of the straining apparatus. Disposed beneath the trough 32 is a longitudinally extending member 39, which also connects the sides 38 and has downwardly diverging legs to which the upper portions of the screens 32 are respectively secured by removable strips 40. The screens 31 are inclined in the same plane as the legs of the member 39 and, in fact, constitute continuations thereof, being secured at their lower edges by removable strips 41 to angularly shaped frame members 42 extending between the lower portions of the sides 38.

The bottom of the straining apparatus is in the form of a pan 43 for receiving the juice passing through the screens 31 and at one end it is provided with a duct 44 for connection to means adapted to convey the juice to the factory.

The delivery trough of apparatus 30, like the delivery trough of apparatus 10, functions to distribute the cush-cush laden juice substantially evenly to the screens, so that the cush-cush collects on the latter in blankets of substantially uniform width and the inclination of the screens are such that the blankets of cush-cush will move therealong under the influence of gravity and fall evenly from both sides of the apparatus. To prevent any undue amount of liquid from being retained in the cush-cush which collects on the screens, means may be provided for slightly compressing the cush-cush to express the juice therefrom. This means may advantageously comprise a sheet of flexible and relatively heavy material 45, which is free at its lower end but is secured at its upper end in spaced relation to the screen to a longitudinally extending rod or the like 46 supported at its opposite ends in the side walls 38. By arranging the sheet of flexible material in this manner, the blanket of cush-cush will pass downwardly between the latter and the screen and, on account of the weight of the flexible sheet, the cush-cush will be slightly compressed to free it of any excess juice retained therein.

To connect straining apparatus 30 with the pipe N leading from pump O, the delivery trough 32 is provided with a lateral extension 47 generally similar to the lateral extension 13 of apparatus 10. It differs slightly in cross sectional shape from the delivery trough, in that it is provided with vertically disposed side walls 48 to prevent the juice from accidentally spilling therefrom. So that the juice will not surge into extension 47, a flexible sheet of material 49, which is secured only at its upper edge, extends downwardly over the inlet 50.

From the foregoing, it will be observed that simple and reliable straining apparatus is provided for insuring even distribution of the cush-cush to the bagasse passing to the mills. It will also be observed that simple and effective means is provided for regulating the flow of juice from the straining apparatus so as to insure a steady and uniform flow of the juice for macerating the bagasse.

What I claim is:

1. A straining apparatus for association with a series of sugar mills including carriers for conveying bagasse from one mill to another, said apparatus including a screen and a sugar juice delivery trough disposed above the screen for distributing the juice substantially evenly thereto, said trough having an edge over which the juice is adapted to discharge onto the screen and said edge being inclined downwardly relatively to the bottom of the trough in the direction of flow of the juice.

2. A straining apparatus for association with a series of sugar mills including carriers for conveying bagasse from one mill to another, said apparatus including an inclined screen, and a sugar juice delivery trough disposed above the screen for distributing the juice substantially evenly thereto, said trough decreasing in width in the direction of flow of the juice and having an edge over which the juice is adapted to discharge onto the screen.

3. A straining apparatus for association with a series of sugar mills including carriers for conveying bagasse from one mill to another, said apparatus including a screen and a sugar juice delivery trough decreasing in width in the direction of flow of the juice and having an edge over which the juice is adapted to evenly discharge onto the screen, said trough having angularly disposed sides and the upper edge of one of said sides constituting said discharge edge.

4. A straining apparatus for association with a series of sugar mills including carriers for conveying bagasse from one mill to another, said apparatus including a screen and a sugar juice delivery trough decreasing in depth in the direction of flow of the juice and having angularly disposed sides, said trough being disposed above the screen and the upper edges of said angularly disposed sides converging in the direction of flow of the juice, one of said edges constituting a lip over which the juice is adapted to discharge onto the screen.

5. A straining apparatus for association with a series of sugar mills including carriers for conveying bagasse from one mill to another, said apparatus including a screen and a substantially V-shaped sugar juice delivery trough disposed above the screen for distributing the juice substantially evenly thereto, said trough progressively decreasing in width and depth in the direction of flow of the juice.

6. A straining apparatus for association with a series of sugar mills including carriers for conveying bagasse from one mill to another, said apparatus including a screen, a sugar juice delivery trough disposed above the screen and having an edge over which the juice is adapted to discharge substantially evenly onto the screen whereby the solid matter is collected on the latter in a blanket of substantially uniform width for delivery to one of said carriers, and adjustable means for varying the angle of the discharge edge of the trough with respect to the horizontal.

7. A straining apparatus for association with a series of sugar mills including carriers for conveying bagasse from one mill to the other, said apparatus including a screen, a sugar juice delivery trough disposed above the screen for distributing the juice substantially evenly thereto, said trough having an edge over which the juice is adapted to discharge onto the screen and said edge being inclined downwardly relatively to the bottom of the trough in the direction of flow of the juice, and adjustable means for changing the elevation of one end of said trough to vary the angle of the discharge edge thereof with respect to the horizontal.

8. A straining apparatus for association with a series of sugar mills including carriers for conveying bagasse from one mill to another, said apparatus including a sugar juice delivery trough decreasing in depth in the direction of flow of the juice and having oppositely disposed edges over which the juice is adapted to discharge, and downwardly diverging screens respectively disposed on opposite sides of the trough for receiving the juice discharging therefrom.

9. A straining apparatus for association with a series of sugar mills including carriers for conveying bagasse from one mill to another, said apparatus including an inclined screen, means for distributing sugar juice substantially evenly to the screen whereby the solid matter is collected on the screen in a blanket of substantially uniform width, and flexible means overlapping the screen adapted to compress the blanket of solid matter against the screen.

10. In combination with a series of sugar mills, of carriers for conveying bagasse from one mill to another, a straining apparatus disposed above one of the carriers for receiving juice from one of said mills, and means for conveying the sugar juice to said apparatus, said apparatus including an inclined screen for straining the juice, a delivery trough arranged above the screen for distributing the juice substantially evenly thereto, said trough being so constructed and arranged as to cause the solid matter to collect on the screen in a blanket of substantially uniform width for delivery to one of said carriers, and means for receiving the strained juice from the screen and causing it to discharge to one of said carriers, said means including a compartment for receiving the strained juice provided with outlet means for controlling the discharge of juice to one of said carriers, said outlet means being of such capacity as compared with the average rate at which the juice is supplied to said compartment that a head of juice is normally maintained in the latter, and said compartment being of such size that the volume of juice normally maintained therein is sufficient to compensate for the normal fluctuations in the supply of juice thereto.

11. In combination with a series of sugar mills, of carriers for conveying bagasse from one mill to another, apparatus to receive sugar juice from one of said mills, said apparatus including a screen for straining the juice, a compartment for receiving the strained juice, and outlet means controlling the discharge of juice from the compartment to one of said carriers, said outlet means being of such capacity as compared with the average rate at which juice is supplied to the compartment as to normally maintain a head of juice in the latter and said compartment being of such size that the volume of juice normally maintained therein by said outlet means is sufficient to compensate for normal fluctuations in said average rate.

12. In combination with a series of sugar mills, of carriers for conveying bagasse from one mill to another, apparatus adapted to receive sugar juice from one of said mills, said apparatus including a screen for straining the juice, a compartment for receiving the strained juice, a chamber for receiving the strained juice from said compartment and having a substantially horizontally disposed portion over which the juice is discharged onto one of said carriers, and outlet means establishing communication between said compartment and said chamber, said means being of such capacity as compared with the average rate at which the juice is supplied to said compartment that a head of juice is normally maintained in the latter, and said compartment being of such size that the volume of juice normally maintained therein is sufficient to compensate for the normal fluctuations in the supply of juice thereto.

13. In combination with a series of sugar mills, of carriers for conveying bagasse from one mill to another, apparatus for receiving sugar juice from one of said mills, said apparatus including a screen for straining the juice, a compartment for receiving the strained juice having outlet means for controlling the discharge of juice from said compartment to one of said carriers, said outlet means being of such capacity that when the juice in said compartment is at a predetermined average head the juice will discharge therefrom at a rate equal to the average rate at which the juice is received in said compartment, and said compartment being of such size as compared with the normal fluctuations in the flow of juice thereto that the head of juice normally maintained therein will not substantially vary from said predetermined average head.

14. A straining apparatus for association with a series of sugar mills including carriers for conveying bagasse from one mill to another, said apparatus being adapted to receive sugar juice from one of the mills and including straining means, a compartment for receiving the strained juice from said straining means, and outlet means adapted to control the discharge of juice from the compartment to one of said carriers, said outlet means being of such capacity as compared with the average rate at which juice is supplied to the compartment as to normally maintain a head of juice in the latter and said compartment being of such size that the volume of juice normally maintained therein by said outlet means is sufficient to compensate for normal fluctuations in said average rate.

15. A straining apparatus for association with a series of sugar mills including carriers for conveying bagasse from one mill to another, said apparatus being adapted to receive sugar juice from one of the mills and including straining means, a compartment for receiving strained juice having outlet means adapted to control the discharge of the juice from said compartment to one of said carriers, said outlet means being of such capacity that when the juice in said compartment is at a predetermined average head the juice will discharge therefrom at a rate equal to the average rate at which the juice is received in said compartment, and said compartment being of such size as compared with the normal fluctuations in the flow of juice thereto that the head of juice normally maintained therein will not substantially vary from said predetermined average head.

ANDREW C. I. COULTER.